R. J. HARRISON.
METHOD OF JOINING TUBES.
APPLICATION FILED OCT. 16, 1916.
1,311,392.
Patented July 29, 1919.
2 SHEETS—SHEET 2.
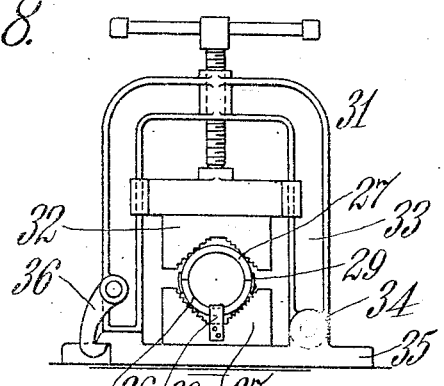
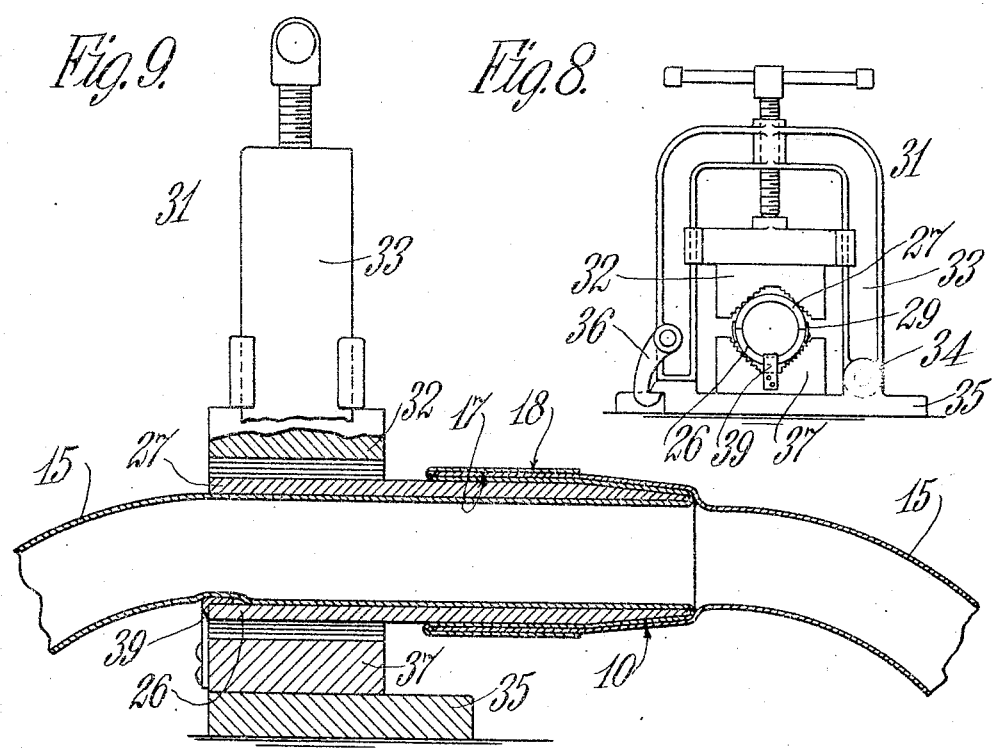
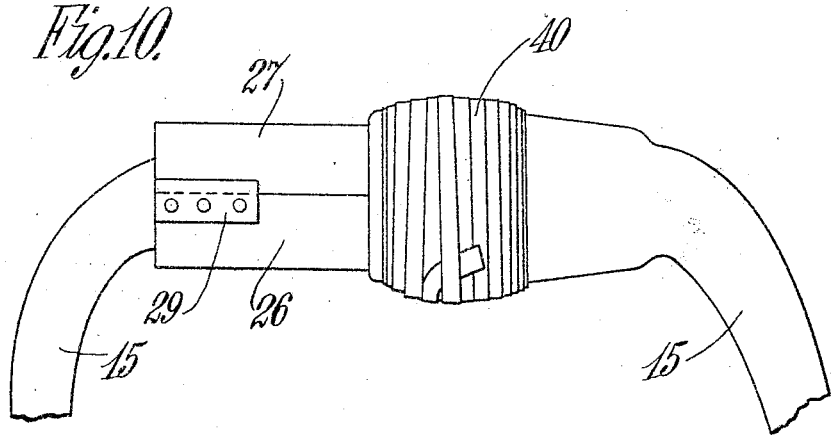
WITNESSES:
H. E. Hartwell.
INVENTOR.
Robert J. Harrison,
BY Chapin + Neal.
ATTORNEYS.

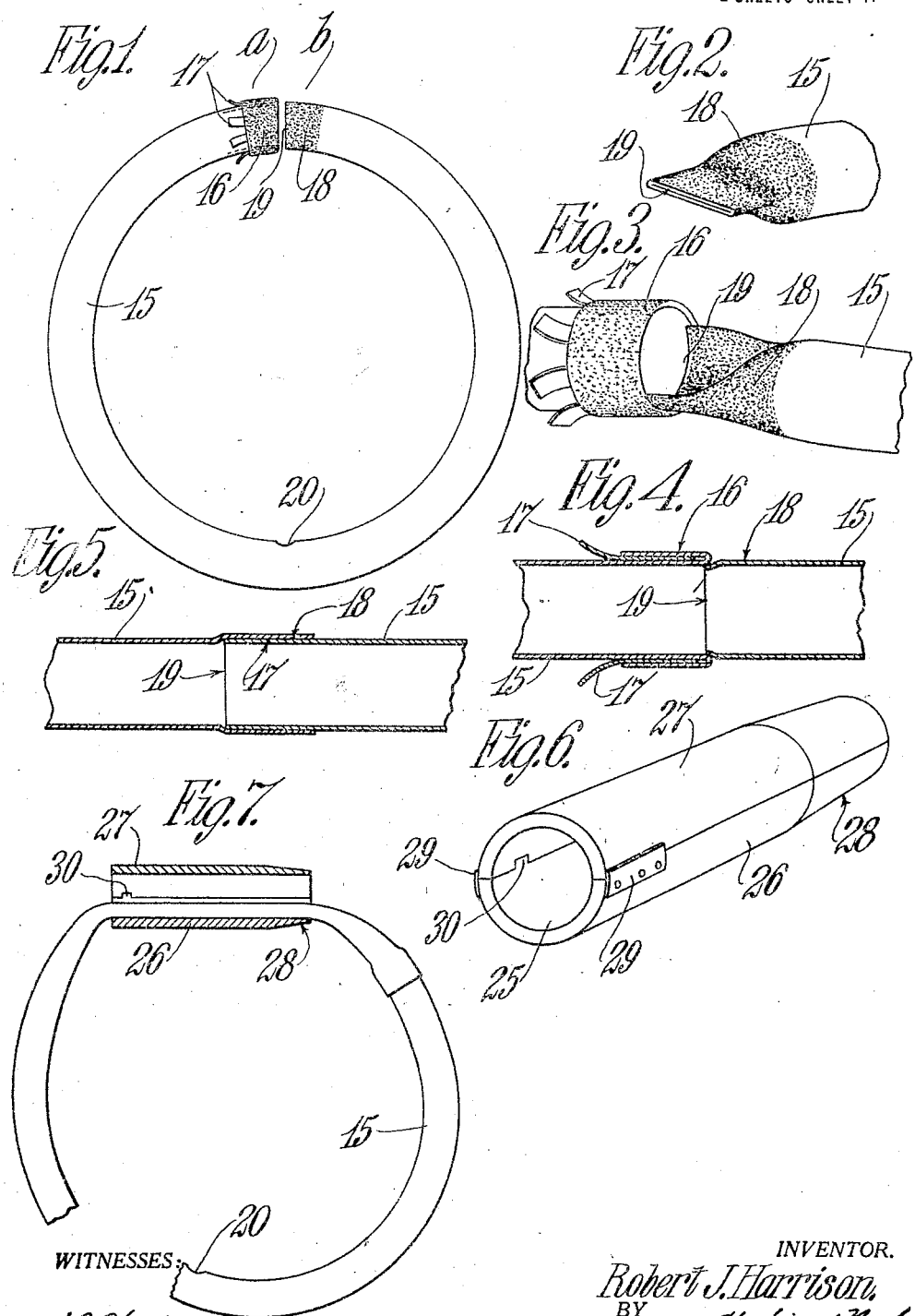

UNITED STATES PATENT OFFICE.

ROBERT J. HARRISON, OF CHICOPEE FALLS, MASSACHUSETTS.

METHOD OF JOINING TUBES.

1,311,392.  Specification of Letters Patent.  Patented July 29, 1919.

Application filed October 16, 1916. Serial No. 125,925.

*To all whom it may concern:*

Be it known that I, ROBERT J. HARRISON, a citizen of the United States of America, residing at Chicopee Falls, in the county of Hampden and State of Massachusetts, have invented certain new and useful Improvements in Methods of Joining Tubes, of which the following is a specification.

This invention relates to a method and apparatus for vulcanizing or cementing tubes to make them endless by the so-called "cold" or "acid" process or the like.

Cold vulcanization, in so far as the chemical process itself is concerned, has long been practised and is now well known. This process has also been applied heretofore in vulcanizing tubes, such as the inner tubes of automobile or bicycle tires. The present invention is not concerned with the chemical side of the cold vulcanization process but rather with a novel and advantageous procedure of mechanical manipulation of the tube which is particularly adapted for use in the cold vulcanization process.

An object of the invention is to provide a method of manipulating the ends of a tube to be joined by the cold vulcanization process which method involves a procedural series of operations for rapidly, conveniently, and efficiently joining tubes with a lap joint and applying pressure thereto.

Another object of the invention is to provide a method of pressing together the telescopically lapped ends of a tube of elastic material, which method consists in looping the tube through a split hollow mandrel, rolling back a portion of the tube while inflated upon the outer surface of the mandrel to bring the lapped portions upon its periphery and in binding the joined portions with an elastic material wrapped under tension to produce a pressure on the joint.

A further object of the invention is to provide apparatus for use in the described method which comprises a separable hollow cylindrical mandrel through which the tube may be looped and thereafter rolled back upon the outer periphery of the mandrel to secure a support for the joint in the tube.

Other objects and advantages will appear in the description to follow and will be pointed out in the annexed claims.

The method and apparatus is disclosed in illustrative form in the accompanying drawings, in which—

Figure 1 is an elevational view of a tube illustrating the first step of the method;

Figs. 2 and 3 are fragmentary perspective views showing subsequent manipulations of the ends of the tube to be joined;

Figs. 4 and 5 are partial sectional elevations showing respectively the temporary and completed joint;

Fig. 6 is a perspective view of a mandrel used for manipulating the tube for the last step in the method;

Fig. 7 is a sectional view showing the joined tube in place in the mandrel;

Fig. 8 is an end elevational view of a vise for gripping and supporting the mandrel;

Fig. 9 is a sectional view showing the joint of the tube positioned on the mandrel in readiness for the application of pressure and Fig. 10 is a fragmentary elevational view showing the manner of applying pressure to the joint.

Referring to these drawings in detail and particularly to Fig. 1, reference 15 represents a tube, such as the inner tube of an automobile or bicycle tire, for example, the ends of which are to be joined with a lap joint by cold vulcanization. One end of tube 15 is first rolled back to expose the inner surface thereof for a distance *a* substantially equal to the length of lap desired and cement is applied to the rolled back surface 16 as indicated by stippling in Fig. 1. Preferably strips 17 of any suitable material, such as cloth or paper, are inserted between the outer periphery and the rolled back portion of tube 15 to prevent adhesion of the latter to the former in case some of the cement finds its way between the adjacent surfaces. Cement is likewise applied on the surface 18 of the other end of the tube for a like distance *b*, and the tube is then laid aside until the cement has set. The cement used is the ordinary cement as employed in cold vulcanization and is too well known in the art to require description here. The steps of the method thus far described may advantageously be accomplished by a single operator.

After the cement on surfaces 16 and 18 has set sufficiently, the tube is preferably passed on to another operator whose province is to lap the cemented surfaces together. The steps employed in thus lapping the ends of the tube are illustrated in Figs. 2 to 5. The end 19 of the tube is first closed off temporarily by pressing the tube down with the fingers of one hand into the shape shown in Fig. 2. The operator then with the other hand applies the nozzle of a pressure tube (connected to a source of compressed air) into the valve opening 20 of tube 15 (Fig. 1) and simultaneouly fits the closed down end 19 slightly within the open end of the tube, as shown in Fig. 3. Thus part of one end of the tube will adhere to the inner surface of the other end of the tube and as the tube is inflated through valve opening 20, the closed down end 19 is blown open and caused to adhere to the other end of the tube throughout its entire periphery. This temporary joining of the ends of the tube may be advantageously aided by pressure of the operator's fingers about the joined portions. The degree of inflation employed need be only sufficient to blow the tube into form so that it may be readily handled and so that the two ends of the tube will be forced together sufficiently to cause them to adhere. The cemented surfaces 16 and 18 are preferably then cleaned with naphtha or the like and next the "acid" is applied to these surfaces. This acid commonly consists of a solution of carbon bisulfid and chlorid of sulfur, but any other suitable solution may be used as desired. Inasmuch as the chemical process of cold vulcanization is now well understood, it is unnecessary to go into the detail of the chemical process itself. Assuming that the ends of the tube 15 are now temporarily fastened together as shown in Fig. 4 and that the tube is still blown to form, the cemented surface 16 is rolled back upon the surface 18 so that a lapped joint is formed as shown in Fig. 5. The tube is then deflated and preferably passed on to another operator for the last steps in the method.

The remaining steps consist in preparing the tube to receive pressure and in applying pressure to the joint continuously during the interval necessary for the vulcanization to take place. These steps involve the use of a mandrel 25 which, as shown in Fig. 6, consists of two mating hollow semi-cylindrical parts 26 and 27. The latter have at one end a tapered outer surface 28 for a purpose which will later appear and preferably are provided with some means to prevent relative longitudinal or transverse movement. Thus strips 29 riveted on the outer surfaces of member 26 extend a short distance thereabove so that the part 27 may be slipped between the strips and held from side displacement. Lugs 30 on member 26 are arranged to enter corresponding slots in member 27, as shown in Figs. 6 and 7, to prevent relative longitudinal displacement of the halves of the mandrel.

The mandrel which has a bore of substantially the same diameter as that of the tube is then applied to the latter by fitting the parts 26 and 27 together over the inflated tube as shown in Fig. 7. The tube is then drawn through the mandrel 25 until the joined portions lie a short distance from the tapered end of the mandrel in substantially the position shown in Fig. 7. Mandrel 25 is next mounted in a suitable vise, such, for example, as the pipe vise 31, shown in Fig. 8. The particular means employed to hold the mandrel may, of course, be anything desired but a pipe vise of the type illustrated has been found well suited for expeditious use. The movable jaw 32 is slidable on a frame 33 pivoted on one side at 34 to base 35 and frame 33 is held to the latter on the other side by a hook 36. The jaw 32 may set with relation to a fixed mating jaw 37 to approximately the outer diameter of mandrel 25 and the vise may be quickly opened and closed by moving the hinged frame 33 which automatically locks with hook 36, the jaw 32 being moved only the slight distance necessary to grip or release the mandrel. A clip 39 fixed to the lower jaw 37 has a horizontally bent portion which fits within the lower half 26 of the mandrel, as shown in Fig. 9. Clip 39 acts as a stop to facilitate proper positioning of the mandrel and also prevents the latter from falling from the vise when the frame 33 is opened.

With the mandrel mounted in the vise 31 as described, the tube is then inflated through opening 20 to a slight degree for the purpose of blowing the tube to form so that it may be readily manipulated for the step now to be described. The tube thus fills the mandrel. That portion of the tube between the joint and the tapered end of the mandrel is rolled back upon the outer surface of the latter. The tapered surface 10 and the inflation of the tube 15 greatly facilitate this operation. The rolling back of the tube as described is analogous to the manner of turning a stocking inside out with the hand. The purpose of this operation is to bring the lapped, superposed, and cemented surfaces 16 and 18 entirely over the cylindrical surface of the mandrel as in Fig. 9, and, when this has been accomplished, the tube 15 may be deflated leaving the joint of the tube firmly supported at all points on the mandrel. After the joint has been supported as described pressure is applied thereto at all points until the vulcanization has become complete. One means of applying this pressure, advantageous because of its simplicity and adaptability for rapid operation, consists in winding elastic tape, such as a rubber band, around the outer periphery of the joint as indicated at 40 in Fig. 10. The rubber band is stretched as it is wrapped around the joint and may be fastened in the simple manner as by inserting the free end under a tensioned lap as shown in Fig. 10.

The tube is then set aside and the joint is allowed to remain under pressure for an interval sufficient to complete the vulcanization, and this interval commonly is about twenty minutes. At the expiration of this time, the tape 40 is unwound, the tube 15 is pulled from the mandrel, and the latter is taken apart to be used over again.

Thus, an improved method of joining, cementing, or vulcanizing tubes by the "cold" or "acid" process has been provided which method is characterized by an advantageous procedure of mechanical manipulation of the tube and is particularly adapted for efficient and expeditious use. The invention has been described in a preferred form for illustrative purposes, but the scope of the invention is defined by the appended claims.

What I claim is—

1. The method of supporting the lapped joint of a tube of elastic material, which consists in looping the tube through a split cylinder, in inflating the tube to form and in thereafter rolling back a portion of the tube upon the outer surface of the cylinder to bring the lapped joint thereupon.

2. The method of applying pressure to the lapped joint of a tube of flexible material which consists in looping the tube through the interior of a hollow cylinder, in inflating the tube to form, in rolling back a portion of the tube upon the outer periphery of the cylinder until the lapped joint rests thereon and in thereafter binding the joint to the cylinder by a wrapping of elastic material.

3. A method of joining tubes of rubber and the like by cold vulcanization which consists in rolling back one end of the tube upon itself for a given distance, in applying cement to the rolled back surface and to the other end of the tube for a distance substantially equal to the first-named distance, in fitting the last named end to the rolled back end of the tube with a butt joint, in applying a suitable cold vulcanizing solution to the cemented portions, in inflating the tube to form, in then bringing the rolled back portion upon the other end of the tube with the cemented surfaces in lapped and intimate relation, in thereafter continuously applying pressure to the joint until its vulcanization has become complete.

4. The method of joining tubes of rubber or the like with a telescopically lapped joint, which consists in rolling back one end of the tube upon itself for a given distance, in applying cement to the rolled back surface and to the outer surface of the other end of the tube for a distance substantially equal to the rolled back portion, in sticking the ends of the tube together with a butt joint, in inflating the tube to form and thereafter rolling the rolled back portion over upon the outer periphery of the other end of the tube so that the cemented surfaces are superposed in intimate relation.

5. The method of telescopically lapping the ends of a tube of rubber or the like which consists in rolling back one end of the tube upon itself for a given distance, in fitting the other end thereagainst with a butt joint, in inflating the tube to form and in thereafter rolling back the rolled back portion over upon the outer periphery of the other end of the tube.

ROBERT J. HARRISON.